United States Patent
Seong et al.

(10) Patent No.: US 9,997,744 B2
(45) Date of Patent: Jun. 12, 2018

(54) RECHARGEABLE BATTERY

(71) Applicant: Samsung SDI Co., Ltd., Yongin-si, Gyeonggi-do (KR)

(72) Inventors: Jae-Il Seong, Yongin-si (KR); Ji-Man Kim, Yongin-si (KR)

(73) Assignee: Samsung SDI Co., Ltd., Yongin-Si (KR)

(*) Notice: Subject to any disclaimer, the term of this patent is extended or adjusted under 35 U.S.C. 154(b) by 41 days.

(21) Appl. No.: 15/341,807

(22) Filed: Nov. 2, 2016

(65) Prior Publication Data
US 2017/0149031 A1  May 25, 2017

(30) Foreign Application Priority Data
Nov. 23, 2015 (KR) .................. 10-2015-0164071

(51) Int. Cl.
*H01M 2/02* (2006.01)
*H01M 2/08* (2006.01)

(52) U.S. Cl.
CPC .......... *H01M 2/0207* (2013.01); *H01M 2/021* (2013.01); *H01M 2/0212* (2013.01)

(58) Field of Classification Search
CPC ... H01M 2/0207; H01M 2/021; H01M 2/0212
See application file for complete search history.

(56) References Cited

U.S. PATENT DOCUMENTS

| | | | |
|---|---|---|---|
| 2006/0093905 A1 | 5/2006 | Kim | |
| 2012/0258354 A1* | 10/2012 | Yamaguchi | H01G 9/08 429/176 |
| 2013/0122336 A1* | 5/2013 | Park | H01M 2/0212 429/82 |
| 2015/0079436 A1* | 3/2015 | Chung | H01M 2/1211 429/87 |
| 2015/0303426 A1* | 10/2015 | Kim | B29C 65/08 429/163 |
| 2016/0315301 A1* | 10/2016 | Kim | H01M 2/1241 |

FOREIGN PATENT DOCUMENTS

| | | |
|---|---|---|
| KR | 10-0571269 B | 3/2006 |
| KR | 10-2015-0009347 A | 1/2015 |

* cited by examiner

*Primary Examiner* — Stewart A Fraser
(74) *Attorney, Agent, or Firm* — Knobbe, Martens, Olson & Bear, LLP

(57) ABSTRACT

A rechargeable battery according to an exemplary embodiment includes: an electrode assembly charging and discharging a current; and a pouch case receiving the electrode assembly and formed with a joint part on a border, wherein the joint part includes a plurality of pressing parts pressing the pouch case to be joined and formed with a non-pressure part in each center thereof.

14 Claims, 6 Drawing Sheets

RECHARGEABLE BATTERY

RELATED APPLICATIONS

This application claims priority to and the benefit of Korean Patent Application No. 10-2015-0164071 filed in the Korean Intellectual Property Office on Nov. 23, 2015, the entire contents of which are incorporated herein by reference.

BACKGROUND

Field

The described technology relates generally to a rechargeable battery.

Description of the Related Art

A rechargeable battery is a battery that can be repeatedly charged and discharged, unlike a primary battery. The rechargeable battery has been used for portable electronic devices such as mobile phones, laptop computers, and camcorders, or has been used as a power source for driving motors of hybrid vehicles.

The rechargeable battery includes an electrode assembly having a positive electrode and a negative electrode, and a separator interposed between the positive electrode and the negative electrode. The electrode assembly is inserted inside the case to perform the charge and the discharge, and the case has a terminal to supply and receive the current.

The case may be made of a metal plate or a pouch, and in the case of the pouch case, the pouch case is made of a laminate film type in which an insulating layer is interposed between metal films.

In the case of the thin plate type battery, the thickness is very thin, and in this case, if a width of a border coupling part for coupling of the pouch case is decreased to correspond to the thickness of the thin plate type battery, the pouch case sealing performance is deteriorated.

The above information disclosed in this Background section is only for enhancement of understanding of the background of the described technology and therefore it may contain information that does not form the prior art that is already known in this country to a person of ordinary skill in the art.

SUMMARY OF CERTAIN INVENTIVE ASPECTS

The present invention provides a rechargeable battery in which the width of the joint part of the pouch case is further reduced by improving a joint force of the pouch case of the rechargeable battery.

A rechargeable battery according to an exemplary embodiment includes: an electrode assembly charging and discharging a current; and a pouch case receiving the electrode assembly and formed with a joint part on a border, wherein the joint part includes a plurality of pressing parts pressing the pouch case to be joined and formed with a non-pressure part in each center thereof.

The plurality of pressing parts may be arranged at a first angle by a border boundary of the pouch case.

The plurality of pressing parts may be arranged at a second angle crossing the first angle.

The plurality of pressing parts may be arranged to be respectively separated by a first distance.

The first distance may be smaller than a width of the non-pressure part.

An outer part of the pressing part may be formed of a circular or polygonal shape.

The non-pressure part may be formed of a circular or polygonal shape.

The rechargeable battery according to an exemplary embodiment may have a reduced width of the joint part on the pouch case border by the improved joint force of the pouch case.

DETAILED DESCRIPTION OF CERTAIN INVENTIVE EMBODIMENTS

Figure 1:
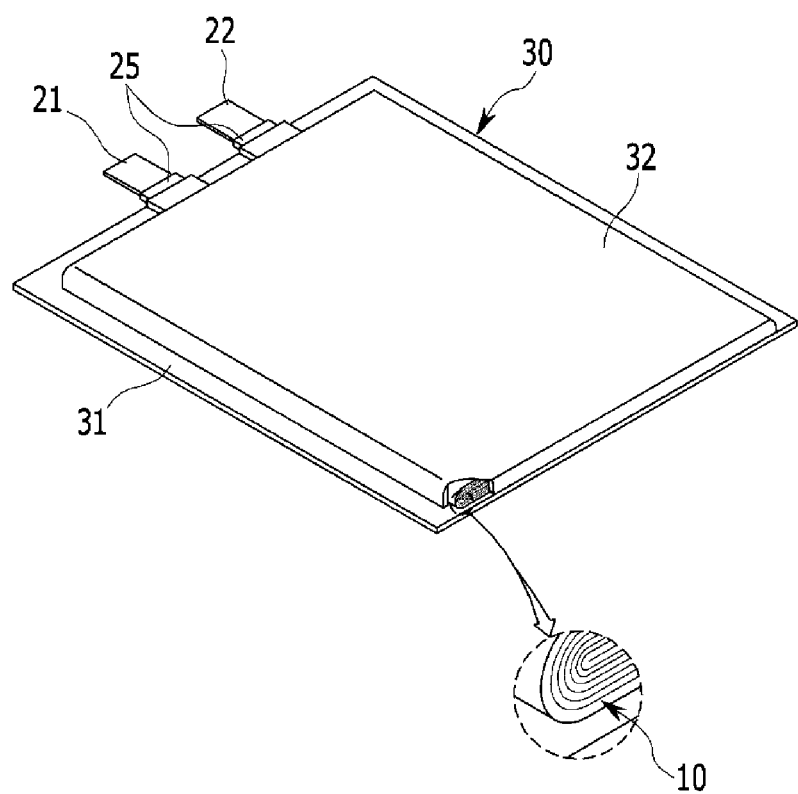
FIG. 1 is a perspective view showing a rechargeable battery applied with a pressing part according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Descriptions of parts not related to the present invention are omitted, and like reference numerals designate like elements throughout the specification.

Further, since sizes and thicknesses of constituent members shown in the accompanying drawings are arbitrarily given for better understanding and ease of description, the present invention is not limited to the illustrated sizes and thicknesses.

In addition, unless explicitly described to the contrary, the word "comprise" and variations such as "comprises" or "comprising" will be understood to imply the inclusion of stated elements but not the exclusion of any other elements.

FIG. 1 is a perspective view showing a rechargeable battery 100 applied with a pressing part according to an exemplary embodiment.

Referring to FIG. 1, the rechargeable battery 100 may include an electrode assembly 10 performing the charge and discharge of the current, and a pouch case 30 receiving the electrode assembly 10.

The electrode assembly 10 includes a first electrode and a second electrode, and a separator disposed therebetween.

The first electrode may be the positive electrode, and the positive electrode may include a positive electrode plate made of a metal thin plate of a strip shape and a positive electrode active material layer coated on one surface or both surfaces of the positive electrode plate. The positive electrode plate may be made of a metal material having excellent conductivity, for example, an aluminum thin plate. The positive electrode active material layer may be formed of a material in which a lithium-based oxide is mixed with a binder, a conductive material, etc.

The second electrode may be the negative electrode, and the negative electrode may include a negative electrode plate made of a metal thin plate of a strip shape and a negative electrode active material layer coated on one surface or both surfaces of the negative electrode plate. The negative electrode plate may be made of a metallic material having excellent conductivity, for example, a copper thin plate. The negative active material layer may be formed of a material in which a negative active material such as a carbon material and the like is mixed with a binder conductive material and the like.

The separator may be formed of a porous material, and may be formed of a polyolefin, a polyethylene, polypropylene, etc.

The first electrode uncoated region is disposed at one lateral end of the electrode assembly in the length direction thereof, and the second electrode uncoated region may be disposed at both lateral ends of the electrode assembly. A first electrode tab 21 is joined to the first electrode uncoated region, and a second electrode tab 22 is joined to the second electrode uncoated region. The first electrode tab 21 and the second electrode tab 22 are protruded outside the pouch case 30, and a protection tape 25 may be wound on the first electrode tab 21 and the second electrode tab 22 to prevent them from being short-circuited with the pouch case 30.

The pouch case 30 may be made of a film (not shown) including an insulating layer (not shown). The insulating layer may be formed on a center of the film. The pouch case 30 includes a receiving part 32 and a joint part 31.

The receiving part 32 may receive the electrode assembly 10 and an electrolyte (not shown) together. The receiving part 32 may be formed to be protruded at one of an upper plate (not shown) or a lower plate (not shown) of the pouch case 30. The lateral surface of the receiving part 32 may be perpendicular to the joint part 31.

The joint part 31 may be formed on the border of the pouch case 30. The upper plate and the lower plate of the pouch case 30 may be pressed on the joint part 31 to be bonded. In the joint part 31, the upper plate and the lower plate may be heat-fused. The electrolyte disposed in the receiving part 32 of the pouch case 30 may be prevented from leaking by the joint force of the joint part 31.

Figure 2:
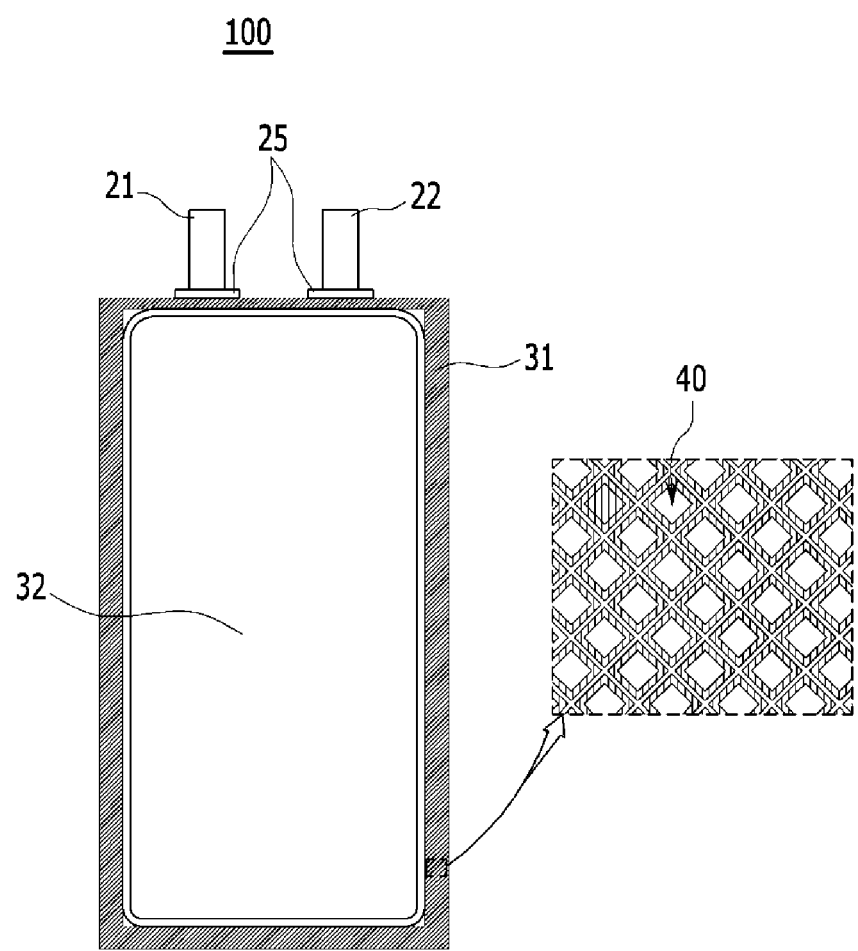
FIG. 2 is an enlarged view of a pressing part of a joint part formed in a border of the rechargeable battery shown in FIG. 1.

FIG. 2 is an enlarged view of a pressing part of a joint part formed in a border of the rechargeable battery 100 shown in FIG. 1.

Referring to FIG. 2, the joint part 31 of the pouch case 30 may be formed along the periphery of the receiving part 32. When the joint force of the joint part 31 of the pouch case 30 is weak or weakens, the electrolyte solution contained in the receiving part 32 may leak outside the pouch case 30.

When an excessive physical force acts on the joint part 31, the film (not shown) forming the upper plate and the lower plate of the pouch case 30 or the insulating layer (not shown) formed inside the film may be damaged. Accordingly, the electrolyte solution may leak outside the pouch case 30.

A pressing part 40 may be formed on the joint part 31 of the pouch case 30. The joint force of the joint part 31 of the pouch case 30 may be improved by the pressing part 40. Particularly, the outer part of the pressing part 40 may be formed to be quadrangular or circular. The pressing part 40 may heat-fuse the upper plate and the lower plate of the pouch case 30 to be bonded.

A plurality of pressing parts 40 may be formed. The plurality of pressing parts 40 may be arranged to be constantly separated by a first distance 50 (referring to FIG. 3). The width of the pressing part 40 may be formed at about 0.2 mm. The first distance 50 may be formed to be smaller than the width of a non-pressure part 42 (referring to FIG. 3).

It is preferable that the first distance 50 is formed at less than ¼ of the outer width of the pressing part 40 compared with the pressing part 40.

The pressing part 40 may be arranged at a first angle with the border boundary of the pouch case 30. Also, the pressing part 40 may be arranged at a second angle crossing the first angle. That is, the pressing part 40 may be disposed in the direction forming the predetermined angle with the border boundary of the pouch case 30. In this case, the first angle may be 45° with the border boundary of the pouch case 30. Accordingly, the second angle crossing the first angle may also be 45° with the border boundary of the pouch case 30.

The pressing part 40 is most densely disposed inside the joint part 31, and may prevent the electrolyte solution contained in the receiving part 32 from leaking.

The non-pressure part 42 may be formed at the center inside the plurality of pressing parts 40. The non-pressure part 42 may be formed of the polygonal or circular shape, like the pressing part 40. The pressing part 40 may include a part that is not pressed by the non-pressure part 42 and a pressure part 44 formed around the non-pressure part 42.

The upper part and the lower part of the pouch case 30 may be heat-fused on the joint part 31 by the pressure part 44 of the pressing part 40. The non-pressure part 42 does not bond the upper part and the lower part of the pouch case 30, however the non-pressure part 42 may prevent the electrolyte solution from leaking with a function like an air cap.

The non-pressure part 42 formed to be quadrangular may be disposed in parallel inside the pressing part 40. Accordingly, the thickness difference of the film of the upper plate and the lower plate of the pouch case 30 may be generated.

The non-pressure part 42 may serve as an air cap in which the air is injected inside the pressing part 40. The non-pressure part 42 like the air gap may generate elasticity on the entire joint part 31, and when the joint force is weak, the non-pressure part 42 may function as a place to contain the electrolyte solution. Also, when the joint force is maintained, the non-pressure part 42 may function to block a path through which the electrolyte solution is leaked.

The upper plate and the lower plate of the pouch case 30 are bonded by the combination of the non-pressure part 42 formed at the pressing part 40 to be pressed at a minimum in the joint part 31, thereby joining the pouch case 30.

Figure 3:
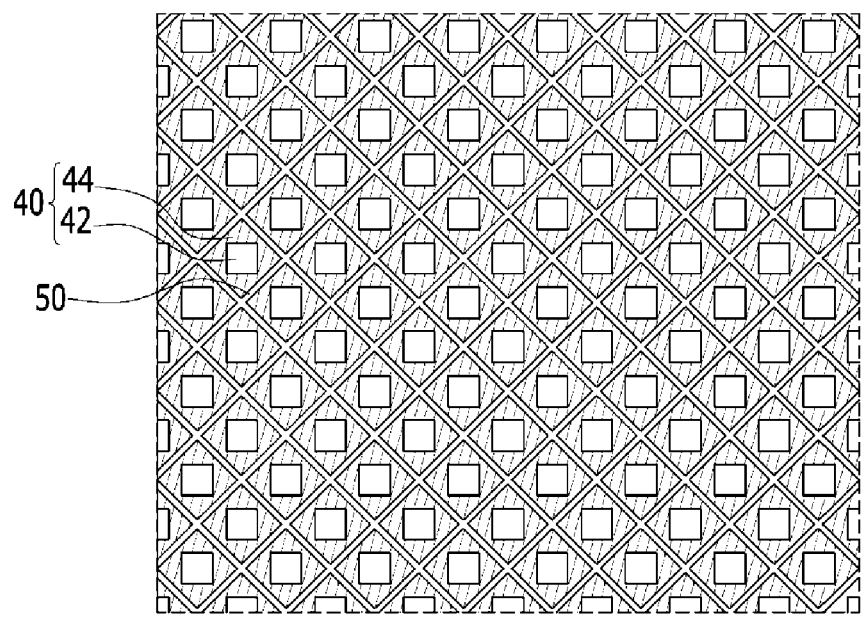
FIG. 3 is an enlarged view showing a first exemplary variation of the pressing part shown in FIG. 2.

FIG. 3 is an enlarged view showing a first exemplary variation of the pressing part shown in FIG. 2.

Referring to FIG. 3, the outer parts of the pressing part 40 and the non-pressure part 42 are formed of the polygonal shape, and inside the pressing part 40, the non-pressure part 42 may be formed in a different direction from that of the outer part of the pressing part 40. That is, the non-pressure part 42 may be disposed inside the pressing part 40 regardless of the shape of the pressing part 40 of the polygonal shape.

The non-pressure part 42 may be inclined by about 45° with reference to the outer edge of the pressing part 40 inside the pressing part 40. However, to maintain the joint force by obtaining the width of the pressure part 44, the non-pressure part 42 may be small compared with the case that the non-pressure part 42 is parallel to the pressing part 40.

When the pressing part 40 is disposed to be inclined by 45° with respect to the border boundary in the joint part of the pouch case 30, the non-pressure part 44 may be disposed in parallel to be inclined by 45° with respect to the pressing part 40. Accordingly, when the joint part 31 is bent to the side of the receiving part 32, the joint part 31 may be bent while the size of the non-pressure part 44 is maintained.

As described above, since the non-pressure part 44 has the function like the air cap, elasticity is generated about the receiving part 32, and when the electrolyte solution leaks, the space capable of containing the electrolyte solution is provided such that the joint force of the pouch case 30 may be improved.

Figure 4:
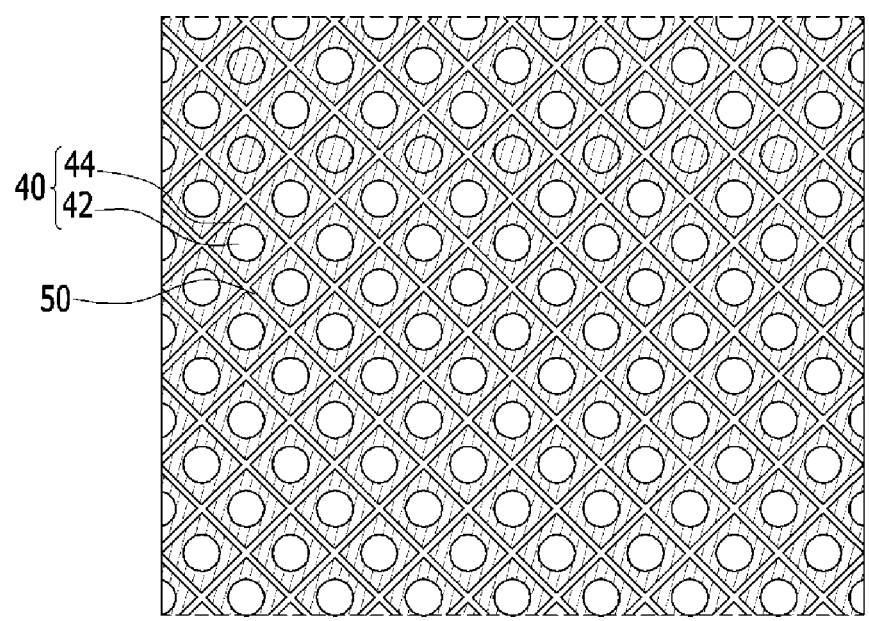
FIG. 4 is an enlarged view showing a second exemplary variation of the pressing part shown in FIG. 2.

FIG. 4 is an enlarged view showing a second exemplary variation of the pressing part shown in FIG. 2.

Referring to FIG. 4, the outer part of the pressing part 40 is formed of the polygonal shape, and the circular non-pressure part 42 may be formed inside the pressing part 40. When the non-pressure part 42 is formed of the circle, there is a merit that the pressure part 44 may be obtained in maximum on the edge of the pressing part 40 inside the pressing part 40.

When the outer of the pressing part 40 is formed of the quadrangle, the pressing part 40 may be densely arranged inside the joint part 31. Accordingly, the electrolyte solution contained in the receiving part 32 is leaked in the joint part 31 of which the joint force is weak, the pressure part 44 formed by the pressing part 40 and the non-pressure part 42 is just formed like a maze inside the joint part 31, thereby preventing the electrolyte solution from being leaked. Particularly, the non-pressure part 42 of the circular shape may further improve of the joint force of the pressure part 44 formed inside the pressing part 40 of the quadrangle.

Figure 5:
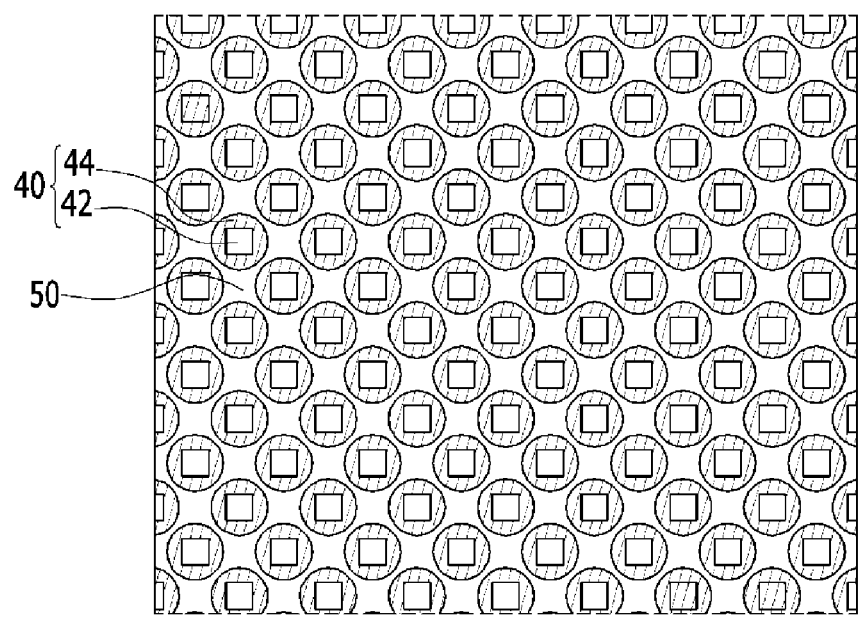
FIG. 5 is an enlarged view showing a third exemplary variation of the pressing part shown in FIG. 2.

FIG. 5 is an enlarged view showing a third exemplary variation of the pressing part shown in FIG. 2.

Referring to FIG. 5, the outer of the pressing part 40 may be formed of the circular shape and the non-pressure part 42 of the polygon shape may be formed therein. When the pressing part 40 is formed of the circular shape, the upper plate and the lower plate of the pouch case 30 may be easily compressed inside the joint part 31. Also, when the pressing part 40 is formed of the polygon shape such as the quadrangle, there is a drawback that the stress is focused on the edge part, which is the pressing part 40, so the stress may be uniformly distributed along the circular arc. Accordingly, the pressing part 40 having the circular outer part may prevent the stress focusing phenomenon.

Figure 6:
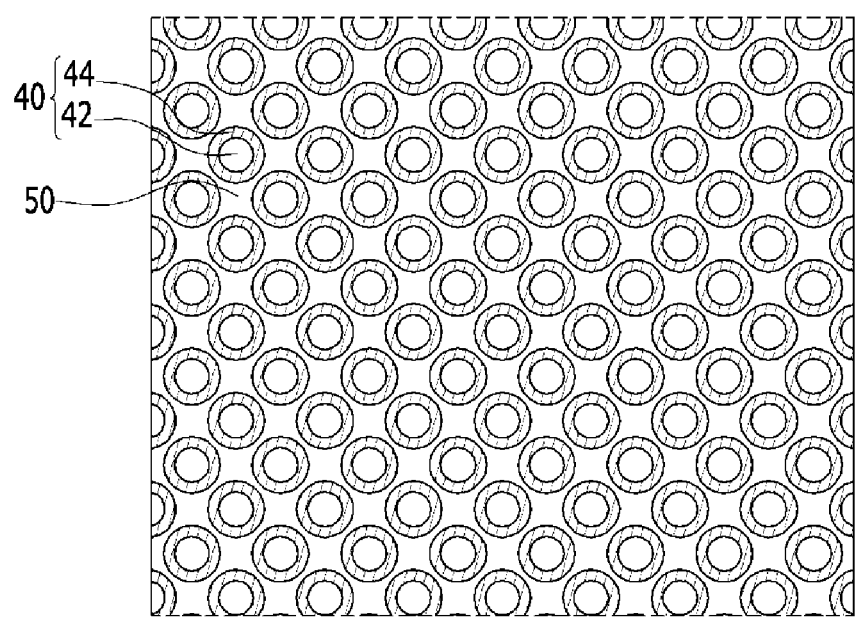
FIG. 6 is an enlarged view showing a fourth exemplary variation of the pressing part shown in FIG. 2.

FIG. 6 is an enlarged view showing a fourth exemplary variation of the pressing part shown in FIG. 2.

Referring to FIG. 6, the outer part of the pressing part 40 and the non-pressure part 42 may be formed of the circular shape. In the case of the circular shape, the pressing part 40 may be disposed while forming the angle of 45° by the border boundary of the pouch case 30. When the outer part has the circular shape, the size of the pressing part 40 may be further reduced to be densely disposed. The non-pressure part 42 formed inside the pressing part 40 closes and seals the pouch case 30 by the function like the air cap, and this effect may be increased as the number of pressing parts 40 is increased.

The plurality of pressing parts 40 may be disposed in a row, and the preceding row and the following row may be parallel. In this case, to be parallel means that the plurality of pressing parts 40 are also uniformly disposed in a column as well as in the row. Accordingly, the plurality of pressing parts 40 may be disposed while matching the rows and the columns, and in this case, the non-compressed part is generated between four adjacent pressing parts 40 formed of the circular, this may be larger than the non-compressed part generated between four adjacent pressing parts 40 formed of the polygonal shape.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly charging and discharging a current; and
a pouch case receiving the electrode assembly and formed with a joint part on a border,
wherein the joint part includes
a plurality of pressing parts pressing the pouch case to be joined and formed with a non-pressure part in each center thereof.

2. The rechargeable battery of claim 1, wherein
the plurality of pressing parts are arranged at a first angle by a border boundary of the pouch case.

3. The rechargeable battery of claim 2, wherein
the plurality of pressing parts is arranged at a second angle crossing the first angle.

4. The rechargeable battery of claim 2, wherein
the plurality of pressing parts are arranged to be respectively separated by a first distance.

5. The rechargeable battery of claim 4, wherein
the first distance is smaller than a width of the non-pressure part.

6. The rechargeable battery of claim 1, wherein
an outer part of the pressing part is formed of a circular or polygonal shape.

7. The rechargeable battery of claim 1, wherein
the non-pressure part is formed of a circular or polygonal shape.

8. A rechargeable battery comprising:
an electrode assembly charging and discharging a current; and
a pouch case receiving the electrode assembly and formed with a joint part on a border wherein the joint part includes a first and a second surface that are coupled to each other and wherein the joint part includes a plurality of pressing parts where the first and second surface are pressed into each other and wherein the plurality of pressing parts each include a non-pressing portion positioned within the pressing parts.

9. The rechargeable battery of claim 8, wherein
the plurality of pressing parts are arranged at a first angle by a border boundary of the pouch case.

10. The rechargeable battery of claim 9, wherein
the plurality of pressing parts is arranged at a second angle crossing the first angle.

11. The rechargeable battery of claim 9, wherein
the plurality of pressing parts are arranged to be respectively separated by a first distance.

12. The rechargeable battery of claim 11, wherein
the first distance is smaller than a width of the non-pressure part.

13. The rechargeable battery of claim 8, wherein
an outer part of the pressing part is formed of a circular or polygonal shape.

14. The rechargeable battery of claim 8, wherein the non-pressing part is formed of a circular or polygonal shape.

* * * * *